(12) United States Patent
Namburi et al.

(10) Patent No.: US 8,774,190 B2
(45) Date of Patent: Jul. 8, 2014

(54) ENHANCED RESEQUENCING OF DATA RECEIVED OVER A WIRELESS COMMUNICATION SYSTEM

(75) Inventors: Shanta P. Namburi, San Diego, CA (US); Pavan C. Kaivaram, San Diego, CA (US); Sarma V. R. K. V. Vangala, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 659 days.

(21) Appl. No.: 12/701,992

(22) Filed: Feb. 8, 2010

(65) Prior Publication Data

US 2011/0194487 A1    Aug. 11, 2011

(51) Int. Cl.
*H04L 12/28* (2006.01)

(52) U.S. Cl.
USPC .......................................... 370/394

(58) Field of Classification Search
USPC ............. 370/252, 394, 359, 412, 419
See application file for complete search history.

(56) References Cited

U.S. PATENT DOCUMENTS

| | | | | |
|---|---|---|---|---|
| 6,693,910 B2* | 2/2004 | Chao | | 370/394 |
| 6,895,011 B1* | 5/2005 | Lassers | | 370/394 |
| 7,031,419 B2* | 4/2006 | Piirainen | | 375/358 |
| 7,120,149 B2* | 10/2006 | Salamat | | 370/394 |
| 7,426,671 B2* | 9/2008 | Kimura | | 714/748 |
| 7,480,308 B1 | 1/2009 | Cohen et al. | | |
| 7,602,719 B2 | 10/2009 | Speight et al. | | |
| 7,680,118 B2* | 3/2010 | Zegers et al. | | 370/394 |
| 7,899,057 B2* | 3/2011 | Noble | | 370/394 |
| 8,018,945 B2* | 9/2011 | Zhang et al. | | 370/394 |
| 8,483,223 B2* | 7/2013 | Black et al. | | 370/394 |
| 2003/0039250 A1* | 2/2003 | Nichols et al. | | 370/394 |
| 2004/0177307 A1* | 9/2004 | Chao | | 714/752 |
| 2005/0190766 A1* | 9/2005 | Ochiai | | 370/394 |
| 2007/0041382 A1* | 2/2007 | Vayanos et al. | | 370/394 |
| 2007/0206600 A1 | 9/2007 | Klimker et al. | | |
| 2008/0107053 A1 | 5/2008 | Kim et al. | | |
| 2008/0253375 A1* | 10/2008 | Yi et al. | | 370/394 |
| 2008/0259832 A1* | 10/2008 | Tseng | | 370/310 |
| 2009/0207802 A1* | 8/2009 | Lee et al. | | 370/329 |

FOREIGN PATENT DOCUMENTS

| | | |
|---|---|---|
| CN | 1338850 A | 3/2002 |
| JP | 2008092485 A | 4/2008 |

OTHER PUBLICATIONS

International Search Report and Written Opinion—PCT/US2011/023888, ISA/EPO—May 11, 2011.
Taiwan Search Report—TW100104149—TIPO—Nov. 15, 2013.

* cited by examiner

*Primary Examiner* — Warner Wong
(74) *Attorney, Agent, or Firm* — S. Hossain Beladi

(57) ABSTRACT

An apparatus and method for efficiently decoding data received in the form of data packets is provided. The design includes at least one decoding unit configured to receive and decode multiple packet groups, each packet group comprising a plurality of data packets received over at least one wireless transmission channel; a buffer arrangement configured to collect complete and incomplete packet groups received over each wireless transmission channel, and a processor configured to direct data packets from the at least one decoding unit to specific locations in the buffer arrangement. The processor further inserts later received data packets into associated packet groups maintained in the buffer arrangement to minimize sequence gaps in the data packets. The design subsequently provides multiple packet groups and any later received data packets from the buffer arrangement to a resequencer.

28 Claims, 8 Drawing Sheets

ENHANCED RESEQUENCING OF DATA RECEIVED OVER A WIRELESS COMMUNICATION SYSTEM

BACKGROUND

1. Field

The present invention relates generally to efficient processing of received data over a wireless communication system.

2. Background

Demand for delivery of data over communications networks continues to expand. Consumers seek delivery of streaming video and other multimedia data at increasing rates over multiple communication channels, including wired and wireless networks and the Internet. Data can be received in different formats and at different rates, but in most if not all cases data is received in the form of data packets.

Wireless transmission of data, including multimedia data, has become more commonplace in the last several years. Wireless communication systems are employed in various applications, including, for example, cellular telephones, paging, wireless local loops, smartphones and personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including frequency division multiple access (FDMA), time division multiple access (TDMA), and code division multiple access (CDMA).

Different domestic and international standards exist and support various air interfaces including, for example, Advanced Mobile Phone Service (AMPS), Global System for Mobile (GSM), General Packet Radio Service (GPRS), Enhanced Data GSM Environment (EDGE), Interim Standard 95 (IS-95) and its derivatives, IS-95A, IS-95B, ANSI J-STD-008 (often referred to collectively herein as IS-95), high-data-rate systems such as cdma 2000, Universal Mobile Telecommunications Service (UMTS), wideband CDMA (WCDMA), and others. These standards are promulgated by the Telecommunication Industry Association (TIA), 3rd Generation Partnership Project (3GPP), 4th Generation Partnership Project (4GPP), European Telecommunication Standards Institute (ETSI), and other well-known standards bodies.

Wireless communication systems are widely deployed to provide various types of communication (e.g., voice, data, multimedia services, etc.) to multiple users. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP/3GPP2/4GPP/4GPP2 Long Term Evolution (LTE) systems, and orthogonal frequency division multiple access (OFDMA) systems.

Users of wireless receiving devices operating on mobile radio networks such as cellular telephone networks receive streaming video, multimedia, and Internet Protocol (IP) transmissions via a wireless communication link. Such transmissions may include teleconference or television broadcasts, multimedia multicasts/broadcasts, and Internet transmissions received on a user's cell phone or other portable wireless communication device.

Due to the limited resources available in typical wireless receiving devices, as well as delays in processing the significant amount of data received, certain bottlenecks or bandwidth issues can occur at various points along the path from receipt to use of the data. As a result, processing of the large amounts of data received can require significant resources. It is desirable to limit the delay issues encountered and/or reduce the amount of processing resources required when decoding received data.

There is therefore a need in the art for techniques and devices that can reduce the amount of delay and the processing resources required in data received via a wireless communication network.

SUMMARY

An apparatus and method for efficiently processing data received in the form of data packets is provided. The design includes at least one decoding unit configured to receive and decode multiple packet groups, each packet group comprising a plurality of data packets received over at least one wireless transmission channel; a buffer arrangement configured to collect complete and incomplete packet groups received over each wireless transmission channel, and a processor configured to direct data packets from the at least one decoding unit to specific locations in the buffer arrangement. The processor further inserts later received data packets into associated packet groups maintained in the buffer arrangement to minimize sequence gaps in the data packets. The design subsequently provides multiple packet groups and any later received data packets from the buffer arrangement to a resequencer.

The present design can be used for various types of data. For example, the design can be used with a single transmission channel or multiple transmission channels, wherein data is transmitted synchronously or asynchronously.

The present design can be used with various over the air interfaces. For example, the techniques can be used with Global System for Mobile Communication (GSM), General Packet Radio Service (GPRS), Enhanced Data GSM Environment (EDGE), or standards based on CDMA such as TIA/EIA-95-B (IS-95), TIA/EIA-98-C (IS-98), cdma2000, Wideband CDMA (WCDMA), 3GPP2, 4GPP2, Long Term Evolution (LTE), and others.

Other features and advantages of the present invention should be apparent from the following description of exemplary embodiments, which illustrate, by way of example, aspects of the invention.

DETAILED DESCRIPTION

One aspect of the present invention is a reduction of the computational processing required upon receipt of data in a wireless communication system. Examples of data in this context are multimedia data including teleconference data, broadcast/multicast service data, internet protocol (IP) data, and voice over IP (VoIP) data. A further aspect of the present invention is the combination of multiple packets, or data packets, into packet groups for transmission over at least one transmission channel or pipe, and upon receipt of transmitted packets which may be received out of order, buffering packets and packet groups separated according to transmission channel for a period of time. Transmission in this context includes any single or multiple carrier/channel transmission arrangement. The present design seeks to insert later received or out of sequence data packets into the sequence of the transmission channel based on packet group designation, sequence number, or some other manner while packets and groups are present in the data buffer or buffers before merging into a resequencer. In this way, fewer processes are required on the receiving device, and receiving device processing capacity can be employed elsewhere.

Figure 1:
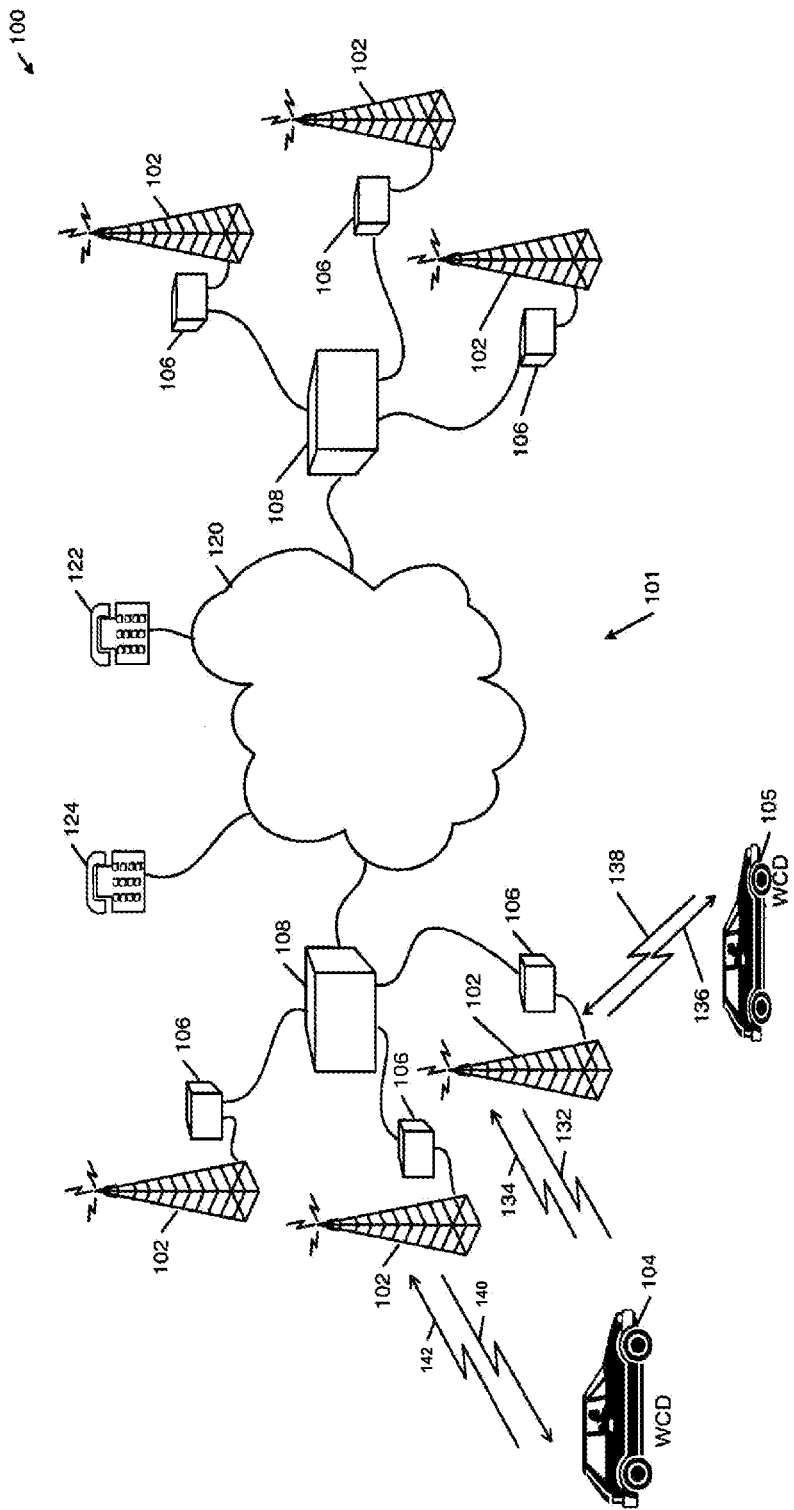
FIG. 1 shows a communication system 100 constructed in accordance with the present invention.

FIG. 1 shows a communication system 100 in accordance with the present invention. The communication system 100 includes infrastructure 101, multiple wireless communication devices (WCD) 104 and 105, and landline communication devices 122 and 124. The WCDs will also be referred to as mobile stations (MS) or mobiles or access terminals (ATs) or terminals. In general, WCDs may be either mobile or fixed. The landline communication devices 122 and 124 can include, for example, serving nodes, or content servers, that provide various types of multimedia data such as streaming data. In addition, MSs can transmit streaming data, such as multimedia data.

The infrastructure 101 may also include other components, such as base stations 102, base station controllers 106, mobile switching centers 108, a switching network 120, and the like. In one embodiment, the base station 102 is integrated with the base station controller 106, and in other embodiments the base station 102 and the base station controller 106 are separate components. Different types of switching networks 120 may be used to route signals in the communication system 100, for example, IP networks, or the public switched telephone network (PSTN).

The term "forward link" or "downlink" refers to the signal path from the infrastructure 101 to a MS, and the term "reverse link" or "uplink" refers to the signal path from a MS to the infrastructure. As shown in FIG. 1, MSs 104 and 105 receive signals 132 and 136 on the forward link and transmit signals 134 and 138 on the reverse link. WCD 104 can transmit and receive from more than one BTS in the arrangement shown, also receiving from a second BTS 102 via receive signal 140 on the forward link and transmitting to the second BTS 102 by transmit signal 142 on the reverse link. In general, signals transmitted from a MS 104 and 105 are intended for reception at another communication device, such as another remote unit, or a landline communication device 122 and 124, and are routed through the IP network or switching network 120. For example, if the signal 134 transmitted from an initiating WCD 104 is intended to be received by a destination MS 105, the signal is routed through the infrastructure 101 and a signal 136 is transmitted on the forward link to the destination MS 105. Likewise, signals initiated in the infrastructure 101 may be broadcast to a MS 105. For example, a content provider may send multimedia data to a MS 105. Typically, one or more communication devices, such as MS or landline communication devices, may both initiate and receive signals.

Examples of MS 104 include a cellular telephone, a smartphone, a wireless communication enabled personal computer, a personal digital assistant (PDA), and other wireless devices. The communication system 100 may be designed to support one or more wireless standards. For example, the standards may include standards referred to as Global System for Mobile Communication (GSM), General Packet Radio Service (GPRS), Enhanced Data GSM Environment (EDGE), TIA/EIA-95-B (IS-95), TIA/EIA-98-C (IS-98), IS2000, HRPD, EHPRD, cdma2000, Wideband CDMA (WCDMA), Long Term Evolution (LTE), and others.

Figure 2:
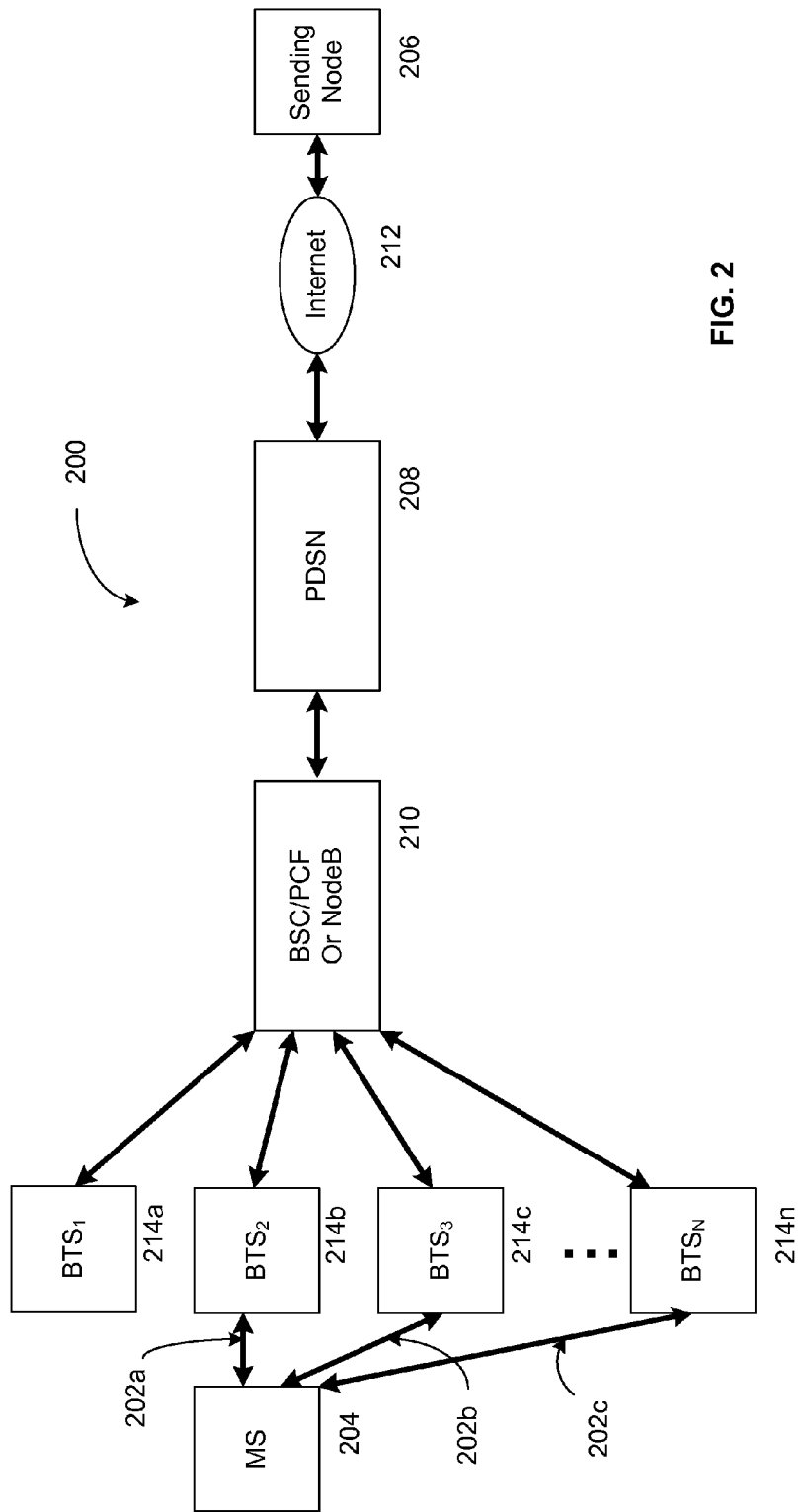
FIG. 2 is a block diagram illustrating an example of a packet data network and various air interface options for delivering packet data over a wireless network.

FIG. 2 is a block diagram illustrating an exemplary packet data network and various air interface options for delivering packet data over a wireless network. The techniques described may be implemented in a packet switched data network 200 such as the one illustrated in FIG. 2. As shown in the example of FIG. 2, the packet switched data network system may include a wireless channel or wireless channels 202, a plurality of recipient nodes or MS 204 (one is shown in FIG. 2), a plurality of BTSs 214a-n, a sending node or content server 206, a serving node 208, and a controller 210. The sending node 206 may be coupled to the serving node 208 via a network 212 such as the Internet.

The serving node 208 may comprise, for example, a packet data serving node (PDSN) or a Serving GPRS Support Node (SGSN) or a Gateway GPRS Support Node (GGSN). The serving node 208 may receive packet data from the sending node 206, and serve the packets of information to the controller 210. The controller 210 may comprise, for example, a Base Station Controller/Packet Control Function (BSC/PCF) or Radio Network Controller (RNC). In one embodiment, the controller 210 communicates with the serving node 208 over a Radio Access Network (RAN). The controller 210 communicates with the serving node 208 and transmits the packets of information over wireless channel(s) 202 via at least one BTS 214, and in some cases multiple BTSs as shown, to at least one of the recipient nodes 204, such as an MS. While a single MS 204 is illustrated, multiple MSs are typically employed in a design similar to that shown in FIG. 2.

In UMTS (Universal Mobile Telecommunications System), controller 210 represents Node B and performs the functionality as described with respect to the BSC/PCF, and may employ UMTS specific transmissions according to UMTS protocols. This functional block will be generally referred to as "BSC/PCF" herein, but it is to be understood that this functional block represents any device performing the functionality described herein.

In one embodiment, the serving node 208 or the sending node 206, or both, includes a decoder for decoding a data stream and/or an encoder for encoding a data stream. For example the encoder encodes a video stream and produces packets of data, and the decoder receives packets of data and decodes them. Likewise, a MS may include an encoder and/or a decoder. The term "codec" is used to describe the combination of an encoder and a decoder.

In one example according to FIG. 2, the sending node 206, connected to the network or Internet 212, transmits data, such as multimedia data, to a recipient node or MS 204, via the serving node, or Packet Data Serving Node (PDSN) 206 and a Controller, or Base Station Controller/Packet Control Function (BSC/PCF) 208. Again, multiple BTSs 214a-214n are functionally located between the MS 204 and the BSC/PCF 210, where wireless channel interfaces 202*a*, 202*b*, and 202*c* are over-the-air interfaces between BTSs 214*a*-214*n* and MS 204 and, typically, can use many channels for signaling and bearer, or payload, data.

The air interface 202 may operate in accordance with any of a number of wireless standards. For example, the standards may include standards based on TDMA or FDMA, such as Global System for Mobile Communication (GSM), General Packet Radio Service (GPRS), Enhanced Data GSM Environment (EDGE), or standards based on CDMA such as TIA/EIA-95-B (IS-95), TIA/EIA-98-C (IS-98), IS2000, HRPD, cdma2000, Wideband CDMA (WCDMA), HRPD (High Rate Packet Data, eHRPD (evolved High Rate Packet Data, 3GPP/3GPP2/4GPP/4GPP2 LTE (Long Term Evolution), and others.

The present design collects multiple contiguous packets at a transmission source, such as at a controller 210, into a packet group and transmits the packet group over the air interface 202. Data packets are transmitted asynchronously in many cases, but may be transmitted synchronously, and data packets may be fragmented into multiple transmission instances. The source typically transmits data contiguously on each channel or carrier, in increasing order of sequence numbers in time with a relatively high probability. The packet group is received at a receiving device, such as MS 204, and packets in a packet group may be incomplete, with stray packets from a packet group received at a later time or out of order. The receiving device is tasked with resequencing these packets and providing them for processing and use at the receiving device.

Figure 3:
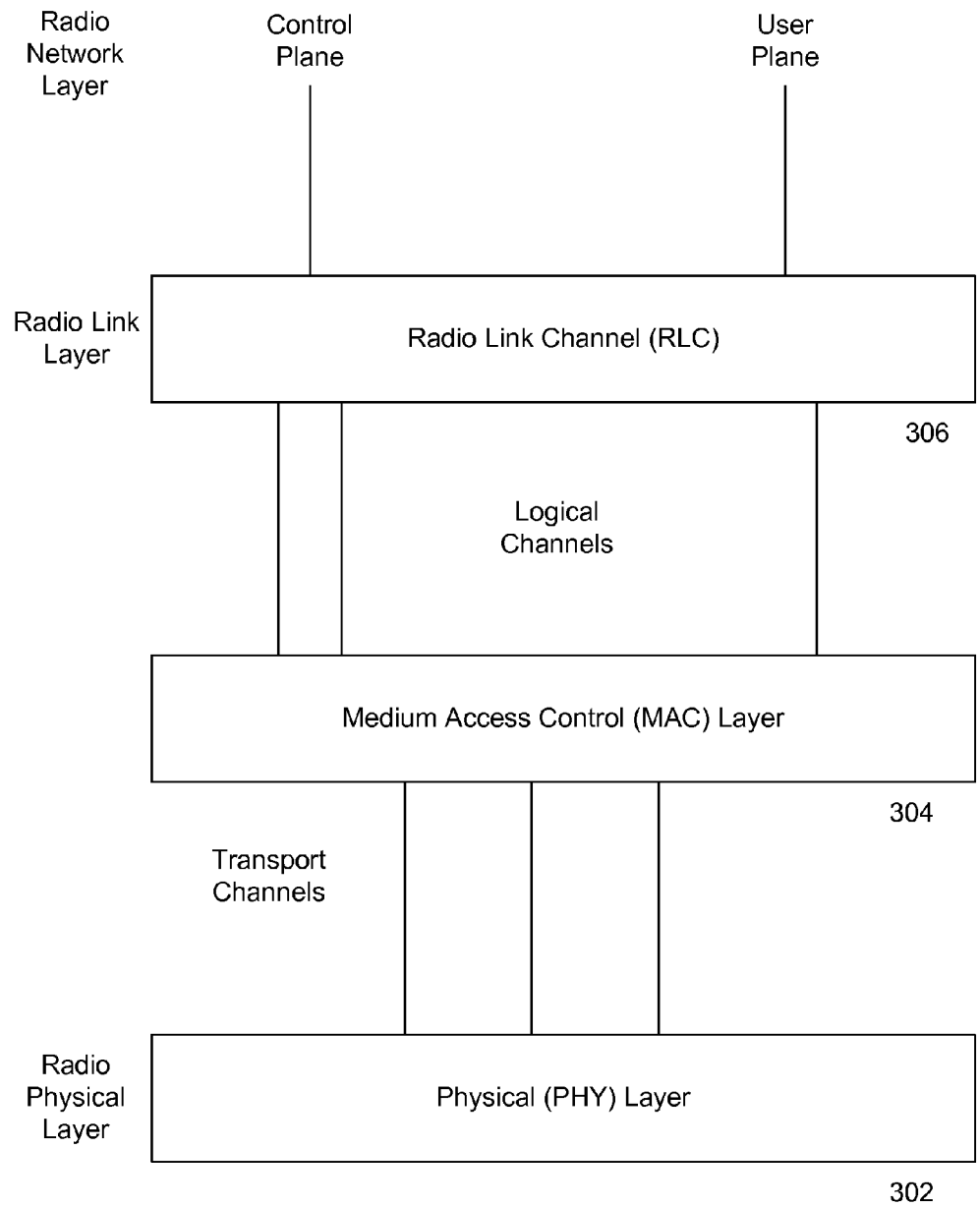
FIG. 3 illustrates the various layers of a device such as a mobile station used in a wireless network.

FIG. 3 illustrates the various layers employed in data receipt. From FIG. 3, the Physical layer (PHY) 306 and Physical layer transport channels receive the incoming transmission and provide the data to Medium Access Control (MAC) layer 304, which in turn sends processed data to Radio Link Control (RLC) 302, which performs much of the functionality disclosed herein at the Radio Link Layer. The Physical layer generally includes characteristics of the air interface channels. A similar but functionally reversed version of FIG. 3 is provided on the transmission side (not shown in FIG. 3), where the transmit RLC groups data packets into packet groups and transmit processing as discussed herein is performed largely at the transmit RLC, using the transmit MAC and PHY layers to provide the desired information and packets.

Figure 4:
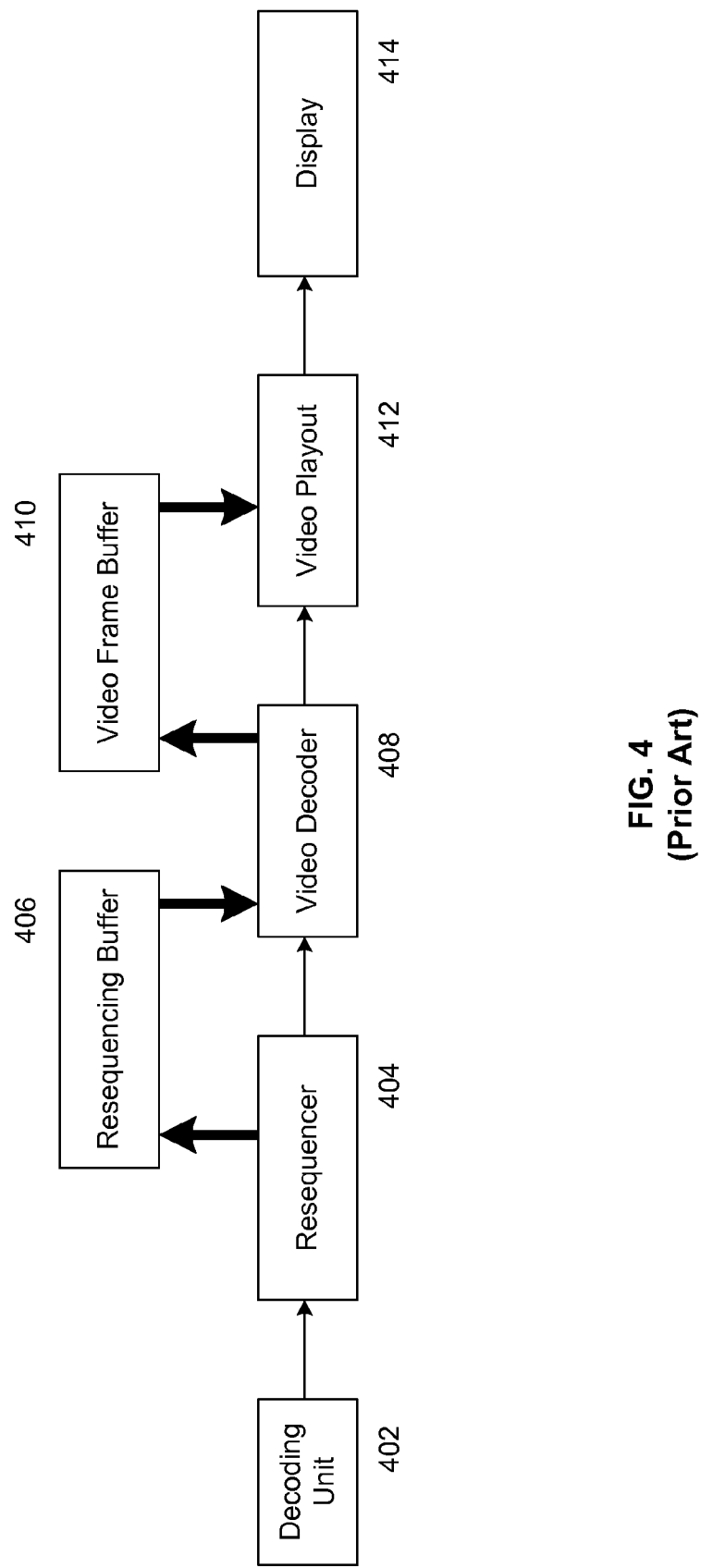
FIG. 4 is a block diagram illustrating components used in decoding a single channel of multimedia data.

FIG. 4 illustrates an example of existing packet processing components used to decode data received at a receiving device such as an MS. From FIG. 4, a decoding unit 402 is configured to receive data packets that make up a multimedia data stream. The output of the decoding unit 402 is connected to an RLP resequencer 404. The RLP resequencer 404 places the channel packets into a resequencing buffer 406 where the channel packets are sequenced in accordance with the sequence number of each packet. A multimedia decoder 408, such as a video decoder, retrieves the data packets from the resequencing buffer 406 and decodes the individual multimedia packets. The multimedia packets are output from the multimedia decoder 408 and placed into a multimedia frame buffer 410 where the multimedia packets are stored. A multimedia play out device 412 retrieves decoded multimedia packets from the multimedia frame buffer 410. The multimedia play out device 412 formats the multimedia packets for presentation to a user in an appropriate multimedia presentation device 414. For example, if the multimedia data is video data, then the multimedia presentation device 414 may be a video display.

With developments in the MS and the increasing need for receipt and processing of more data, current MSs are configured with multiple channels or pipes able to receive data, and multiple decoding units, but typically a single resequencer. Not shown in FIG. 3 is a CPU controlling the various elements presented. With multiple packets of data arriving over multiple data channels, resequencing later received data can require a significant amount of processor (CPU) resources. In the past, the resequencer has employed a linear solution to locate and insert later received packets into the proper order, including comparing the header or address of each stray packet with information about each missing packet in the sequence. With the ever increasing number of packets being received over multiple pipes, processing delays can result.

Figure 5:
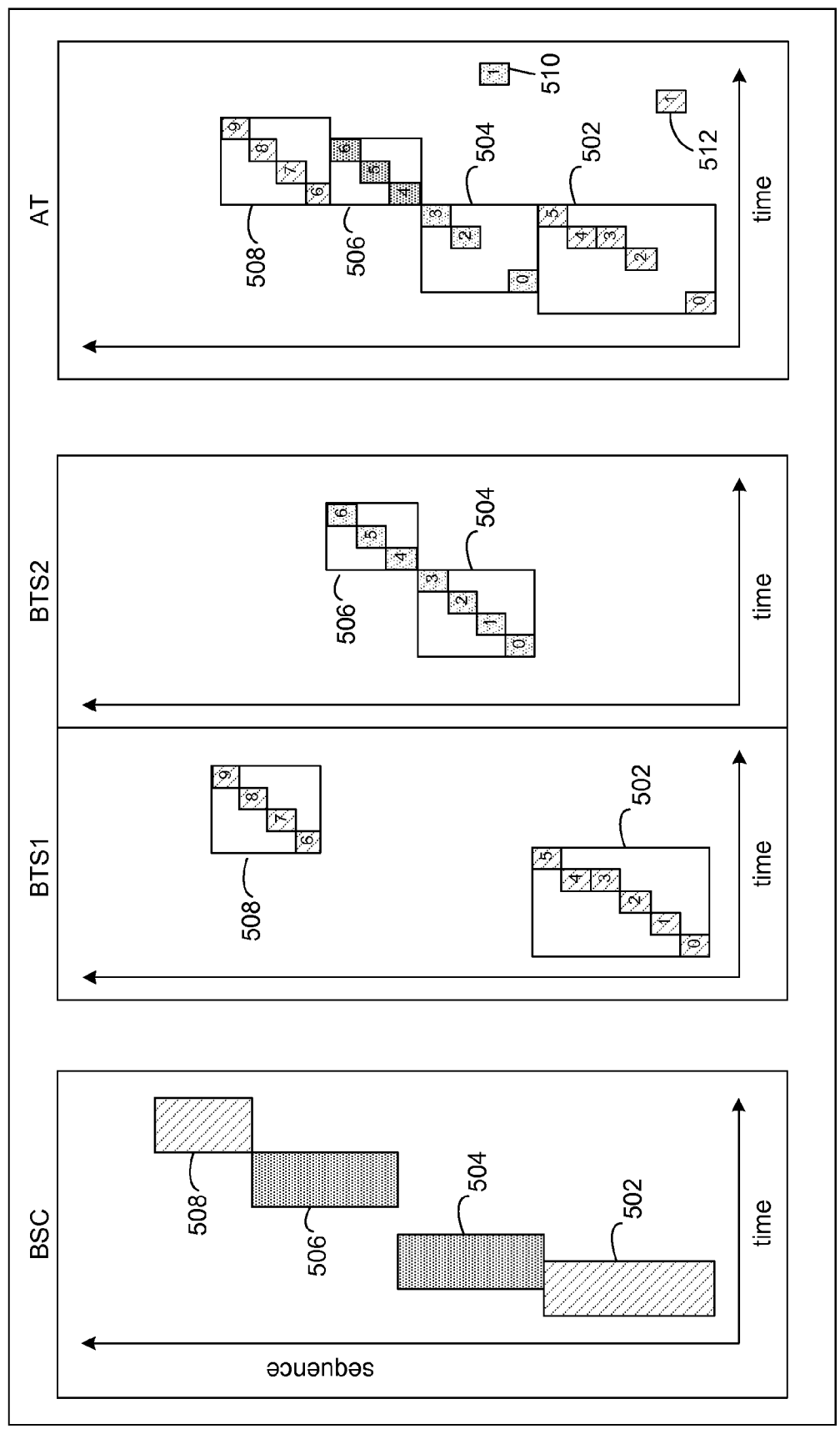
FIG. 5 illustrates an example of operation of the present design in the presence of two transmission channels.

The present design addresses the increase in CPU resource requirements by providing enhanced processing prior to employing a resequencer such as resequencer 404. After contiguous packets are grouped and transmitted by the source, such as by a BSC over one or more channels, the receiving device receives the individual data packets and buffers data packets over a period of time, including separately buffering packets received over each channel. The processor, at an appointed time, evaluates the packets and groups and locates stray packets in appropriate holes or gaps. This pre-processing of smaller packet groups received over each channel decreases the overall amount of data packet processing required. Once this pre-processing is completed, the packets for each channel can be provided to the resequencer, which can address any packets not placed in sequence by the pre-processing. Resequencing and associated processing or subsequent processing (such as ARQ processing) occurs thereafter. In the present design, multiple contiguous stray data packets may be inserted into appropriate sized gaps in the packet group or in sequence for packets available in the buffer or buffers FIG. 5 illustrates transmission of packets in accordance with the present design by a transmitter device, such as a BSC. The left axis in each graph in FIG. 5 represents the sequence of the data, while the bottom axis represents time. Two sets of data are transmitted, one set over each channel, and as can be seen one channel transmits the first and fourth groups of data while the second channel transmits the second and third groups.

Contiguous packets are grouped such as in groups 502 and 508, transmitted over BTS channel 1, and groups 504 and 506, transmitted over BTS channel 2. The number of packets grouped together may vary depending on circumstances encountered, CPU capacity, buffer sizes, and various other factors. For example, certain physical layer (PHY) packet size limits may exist, and multiple instances of data may be transmitted from a single packet group. The packets grouped together are contiguous, thus assisting in reassembling the groups upon receipt. In packet group 502, six packets are illustrated, while packet group 508 includes four packets, packet group 504 four packets, and packet group 506 three packets. The packet group containing each packet may have a designation associated therewith, i.e. a data packet group number or identifier, and this data packet group number or identifier may be provided in the packet, such as in the header, or the packet group number or identifier may not be provided in a given data packet in any form. From FIG. 5, the receiver, such as an MS, receives two stray packets out of order, namely packets 510 and 512. The receiver seeks to locate these packets 510 and 512 in the appropriate order using a buffering arrangement.

Figure 6:
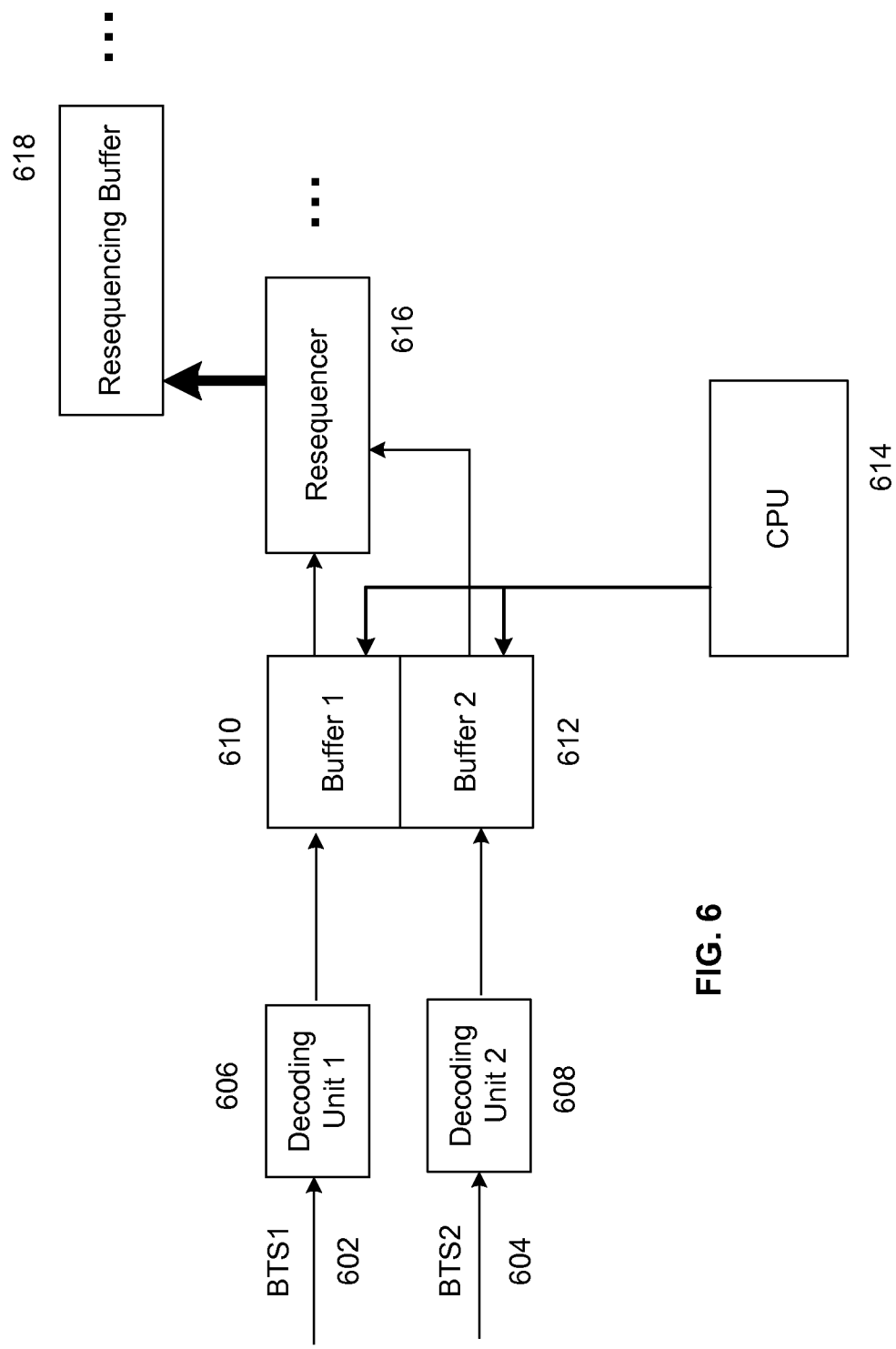
FIG. 6 shows a block diagram illustrating components used in decoding two transmission channels in accordance with an embodiment of the present invention.

FIG. 6 illustrates the present design, including buffers used to buffer multiple channels of data received. FIG. 6 illustrates two channels of data, corresponding to the two channels illustrated in FIG. 5, but any number of channels and buffers may be employed. A smaller number of buffers may be employed with data provided to certain segregated sections of buffers. For example, in FIG. 6, a single buffer may be employed with a first portion of the buffer containing packets from channel 1 and a second portion of the buffer containing packets from channel 2.

FIG. 6 shows first data channel 602 and second data channel 604, with decoding units 606 and 608. Buffers 610 and 612 buffer channel 1 data and channel 2 data, respectively. Once a certain amount of data has been collected or a certain amount of time has passed, CPU 614 processes the data and seeks to place later received channel 1 data in buffer 610 into an appropriate group. From FIG. 5, packet 510 is evaluated against missing data from packet groups 502 and 504, and as only a single packet is missing, the CPU 614 causes the packet to be inserted in proper sequence, namely in the gap in packet group 502. Note that such a design contemplates that packet group numbers are available to the CPU. Buffer 612 contains channel 2 data, and CPU 614 compares packet 512 against the missing data from packet groups 504 and 506, and inserts packet 512 into the proper sequence within packet group 504. The system then provides completed packet groups 502, 504, 506, and 508 to RLP resequencer 616. The remaining processing, subsequent to resequencer 616 and resequencing buffer 618 is as shown in FIG. 4 and is not shown in FIG. 6.

Figure 7:
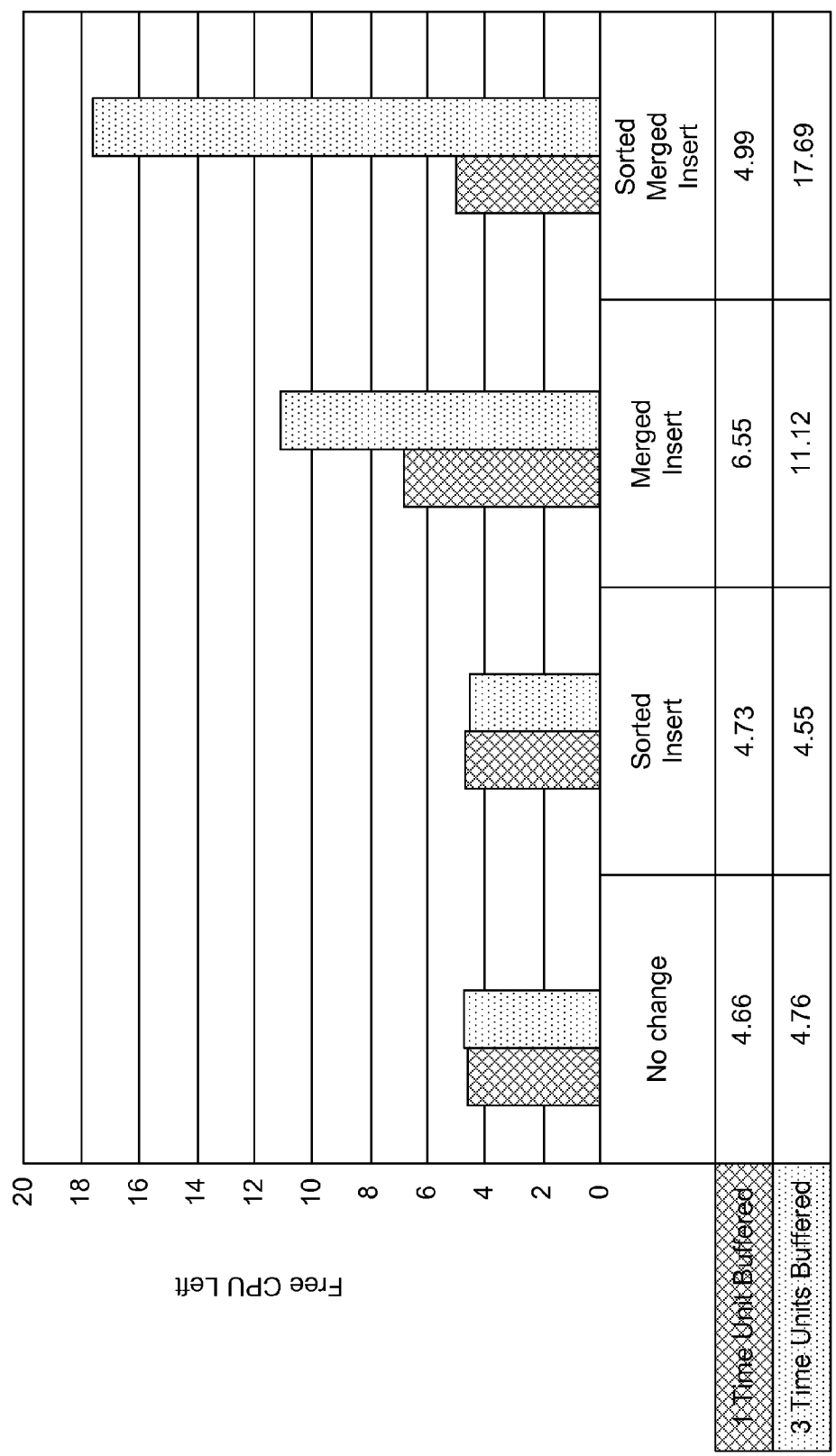
FIG. 7 illustrates performance graphs for operation of the present design under different conditions.

While FIGS. 5 and 6 show relatively simple examples, grouping contiguous packets and buffering data in the manner suggested provides CPU improvements when larger numbers of groups and packets are buffered in the manner shown. FIG. 7 illustrates the amount of CPU resources conserved using the present design. From FIG. 7, using the design of FIG. 4 in the presence of multiple channels of data, buffering for one unit of time data results in 4.66 units of free CPU processing available. Buffering for a longer time, namely three units of time, results in 4.76 units of free CPU processing available. If the incoming packets are sorted, or separated by incoming channel, savings increase to 4.73 units of free CPU processing but decrease when buffered for three time units. When pre-processing, using buffering to merge packets without separating the data by channels, available processing capacity increases. Finally, when data is sorted by channel and later arriving data packets are merged with appropriate packet groups, and data is buffered over three time units in this example, the result is a significant savings in processing resources.

Figure 8:
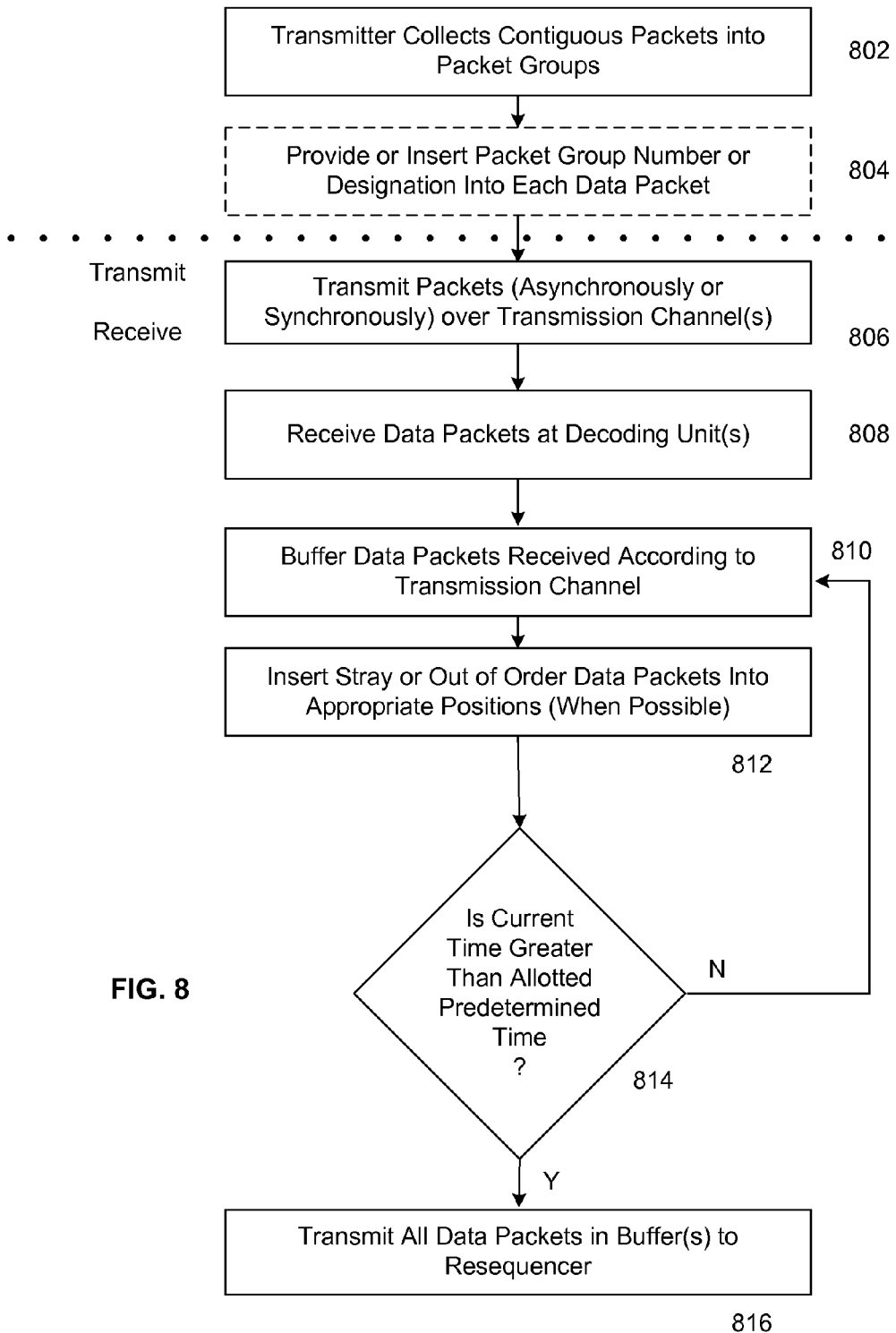
FIG. 8 is a flowchart illustrating transmission and receipt of multimedia data according to an embodiment of the present design.

FIG. 8 illustrates an overall flowchart for the present design. From FIG. 8, on the transmission side, the transmitter collects contiguous data packets into packet groups at point 802. An optional block 804 provides or inserts the group number or other group identifier into each data packet to be transmitted. The transmitter transmits the data, over any number of channels, synchronously or asynchronously, at point 806. At point 808, the data packets are received at the decoding unit(s). Data packets received are buffered according to transmission channel at point 810, and later received or out of sequence data packets are evaluated and inserted where appropriate at point 812. As discussed below, blocks 810 and 812 are optional, in that as described below, one or both of the functions shown may be performed by the receiving device. Block 814 evaluates whether an allotted predetermined amount of time has elapsed. If such an amount of time has not passed, the system continues to evaluate data packets as illustrated. If such an amount of time has passed, the system passes the data packets in the buffer(s) to the resequencer as shown by block 816.

If the functionality of block 812 is not provided, and only the functionality of block 810 is available, the system collects data packets according to transmission channel, and after an allotted predetermined time data passes to the resequencer as shown by point 816.

With respect to point 812, and inserting packets where appropriate, such reinsertion may be accomplished using various techniques. If data packets are provided with a packet group number as shown in point 804, the receiving device having a stray packet may evaluate the packet group number of that packet and search for gaps only in that group, and compare that data packet with each gap in the group to determine whether the data packet fits into one of the gaps. If a data packet is from packet group 01101, but no packet group 01101 data packets reside in the buffer or buffers, no comparisons are made—the stray data packet from packet group 01101 is simply provided to the resequencer without further processing. If no packet group identifier is provided with each data packet, data packets are buffered irrespective of transmission channel and a comparison made with data from all packet groups. While this process requires further computational resources to process stray data packets than the situation wherein packet group numbers are provided with each data packet, such a procedure requires fewer resources and/or processing steps to intake data packets, as each data packet does not need to be evaluated to determine its packet group number or identifier.

As noted, circumstances may exist wherein later received packets or packets received out of order may not be reinserted into an appropriate place in sequence before time expires and all data packets are sent to the resequencer. In such an arrangement, the resequencer operates to resequence data packets and may have an ability to reinsert the data in an appropriate place, which is its primary function. The resequencer may operate in a linear manner, seeking to insert the stray data packet into the sequence by sequentially comparing information about the data packet to each gap in the sequence by systematically progressing through such gaps. However, fewer stray data packets are typically encountered using the present buffering and pre-processing design, and required resequencing resources are typically less. Even after processing by the resequencer, gaps may exist and stray data packets may exist, at which time ARQ processing or other resequencing procedures may be invoked.

One alternative embodiment of the present design is to employ one of the two suggested processes rather than both sorting by transmission channel and pre-processing. For example, data may be separated by transmission channel before transmitted to the resequencer without processing the data while in the buffer or buffers. In other words, data may simply be buffered for each transmission channel and the data packets of each transmission channel passed to the resequencer without attempting to insert stray data packets in appropriate gaps in the sequence. Alternately, the device may collect all data in a single buffer, without separating data by channel received, and may seek to pre-process received data by attempting to re-insert data packets in sequence or in appropriate groups without separating the data by transmission channel. Such a design can in certain instances offer processing benefits.

As noted, number of data packets in each packet group, amount of data buffered in the receiving device, and the time interval over which data is buffered in the receiving device before being pre-processed or sent to the resequencer can vary and depends on the circumstances presented. For example, if little room is available in which to buffer data packets before being transmitted to the resequencer, the size of packet groups may be smaller and the amount of time before data is pre-processed may be less than if more buffering space is available. Thus the values employed in executing the current design may vary, and some amount of evaluation of such values may result in processing gains while still within the scope of the present invention.

While FIG. 6 and certain passages herein disclose multiple transmission channel operation, the present design may be applied in the case of a single transmission channel or pipe. Such a design may simply collect packets in packet groups, may buffer packets and seek to insert stray packets or later received packets in sequence before providing data packets to the resequencer. Certain advantages in processing may be realized using such a design in a single transmission channel application.

A further alternative to the present design is to operate the resequencer in a manner other than linearly comparing each data packet with each gap in a given sequence. As noted, such a linear procedure is highly CPU intensive, particularly in the presence of multiple transmission channels. Improved performance may be achieved in certain instances if the resequencer evaluates the stray packet or later received packet and determines its sequence number, and assesses whether the packet sequence is above or below a midpoint in the sequence. For example, if the data packet is evaluated and it includes a sequence number of 1101101 (sequence 109), the resequencer having 400 data packets may evaluate only the first 200 data packets, or fewer if desired or available. A sequence or set of data packets in the resequencer buffer may be divided into halves, quarters, eighths, and so forth to locate appropriate ranges where a stray packet may fit and processing may selectively omit regions where the stray data packet clearly does not belong.

Those of skill in the art will recognize that the step of a method described in connection with an embodiment may be interchanged without departing from the scope of the invention.

Those of skill in the art would also understand that information and signals may be represented using any of a variety of different technologies and techniques. For example, data, data packets, packet groups, instructions, commands, information, signals, and bits that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless communication device comprising:
at least one decoding unit configured to receive a plurality of packet groups, each packet group comprising a plurality of data packets received over a plurality of wireless transmission channels, and decode the plurality of data packets received over the plurality of wireless transmission channels;
a buffer arrangement connected to the decoding unit, the buffer arrangement configured to collect complete and incomplete packet groups received over each wireless transmission channel; and
a processor configured to direct data packets from the at least one decoding unit to specific locations in the buffer arrangement;
wherein the processor is further configured to identify sequence gaps in the plurality of data packets, and insert later received data packets into the proper sequence gap within the associated packet groups maintained in the buffer arrangement to complete the packet groups and minimize sequence gaps in the data packets, and wherein the wireless communication device is further configured to subsequently provide multiple completed packet groups and any later received data packets not properly sequenced by the processor from the buffer arrangement to a resequencer.

2. The wireless communication device of claim 1, wherein each packet group has been formed from a plurality of sequentially contiguous data packets.

3. The wireless communication device of claim 1, wherein each data packet includes a packet group identifier identifying the packet with a specific packet group, and wherein the processor is configured to evaluate each later received data packet for its packet group identifier and search for gaps in the packet group associated with the packet group identifier.

4. The wireless communication device of claim 1, wherein the processor compares each later received data packet transmitted over a specific wireless transmission channel against data packets in the buffer arrangement received over the specific wireless transmission channel.

5. The wireless communication device of claim 1, further comprising
at least one additional decoding unit, each decoding unit associated with one wireless transmission channel;
wherein the buffer arrangement comprises a plurality of buffer regions, each buffer region associated with one wireless transmission channel.

6. The wireless communication device of claim 1, wherein data packets placed with an appropriate packet group and later received packets not placed with an appropriate packet group are provided to the resequencer.

7. The wireless communication device of claim 1, further comprising a timing arrangement, wherein the processor causes multiple packet groups and any later received data packets to be transmitted from the buffer arrangement to the resequencer after a predetermined amount of time has elapsed according to the timing arrangement.

8. The wireless communication device of claim 1, wherein data packets are asynchronously transmitted over each wireless transmission channel.

9. A process for processing data packets received at a wireless communications device into a desired order, comprising:
decoding a plurality of data packets received over a plurality of wireless transmission channels at the wireless communications device, each data packet associated with a packet group;
collecting complete and incomplete packet groups received over each wireless transmission channel in a buffer arrangement;
identifying sequence gaps in the plurality of data packets;
inserting later received data packets into associated packet groups in the buffer arrangement where possible to complete packet groups and minimize sequence gaps in the data packets; and
sending completed packet groups and later received data packets not properly sequenced from the buffer arrangement to a resequencer.

10. The process of claim 9, wherein each packet group has been formed from a plurality of sequentially contiguous data packets.

11. The process of claim 9, wherein each data packet includes a packet group identifier identifying the packet with a specific packet group, and the process further comprises evaluating each later received data packet for its packet group identifier and searching for gaps in the packet group associated with the packet group identifier.

12. The process of claim 9, further comprising comparing each later received data packet transmitted over a specific wireless transmission channel against data packets in the buffer arrangement received over the specific wireless transmission channel.

13. The process of claim 9, wherein collecting complete and incomplete packet groups in the buffer arrangement comprises collecting complete and incomplete packet groups in a plurality of buffer regions, each buffer region associated with one wireless transmission channel.

14. The process of claim 9, wherein data packets placed with an appropriate packet group and later received packets not placed with an appropriate packet group are sent to the resequencer.

15. The process of claim 9, wherein the sending comprises transmitting multiple packet groups and any later received data packets from the buffer arrangement to the resequencer after a predetermined amount of time has elapsed.

16. The process of claim 9, wherein data packets are asynchronously transmitted over each wireless transmission channel.

17. A wireless communication device comprising:
means for decoding a plurality of data packets received over a plurality of wireless transmission channels at the wireless communications device, each data packet associated with a packet group;
means for collecting complete and incomplete packet groups received over each wireless transmission channel in a buffer arrangement;
means for identifying sequence gaps in the plurality of data packets;
means for inserting later received data packets into the proper sequence gap within the associated packet groups in the buffer arrangement where possible to complete the packet groups and minimize sequence gaps in the data packets; and
means for sending completed packet groups and later received data packets not properly sequenced from the buffer arrangement to a resequencer.

18. The wireless communication device of claim 17, wherein each packet group has been formed from a plurality of sequentially contiguous data packets.

19. The wireless communication device of claim 17, wherein each data packet includes a packet group identifier identifying the packet with a specific packet group, and wherein the inserting means is configured to evaluate each later received data packet for its packet group identifier and search for gaps in the packet group associated with the packet group identifier.

20. The wireless communication device of claim 17, wherein the inserting means compares each later received data packet transmitted over a specific wireless transmission channel against data packets in the buffer arrangement received over the specific wireless transmission channel.

21. The wireless communication device of claim 17, wherein the buffer arrangement comprises a plurality of buffer regions, each buffer region associated with one wireless transmission channel.

22. The wireless communication device of claim 17, wherein data packets placed with an appropriate packet group and later received packets not placed with an appropriate packet group are provided to the resequencer.

23. The wireless communication device of claim 17, further comprising a timing arrangement, wherein the sending means causes multiple packet groups and any later received data packets to be transmitted from the buffer arrangement to the resequencer after a predetermined amount of time has elapsed according to the timing arrangement.

24. The wireless communication device of claim 17, wherein data packets are asynchronously transmitted over each wireless transmission channel.

25. A processor, comprising:
a buffering module configured to provide decoded data packets transmitted as packet groups over a plurality of wireless data transmission channels to a buffer arrangement connected to the processor, and a data packet insertion module configured to identify sequence gaps in packets groups and insert out of sequence data packets into sequence gaps in associated packet groups maintained in the buffer arrangement when possible to minimize sequence gaps in the data packets, and provide completed packet groups and later received data packets not properly sequenced into the appropriate sequence gap to a resequencer.

26. The processor of claim 25, wherein each data packet includes a packet group identifier identifying the packet with a specific packet group, and wherein the processor is configured to evaluate each later received data packet for its packet group identifier and search for gaps in the packet group associated with the packet group identifier.

27. The processor of claim 25, wherein the processor is configured to compare each later received data packet transmitted over a specific wireless transmission channel against data packets in the buffer arrangement received over the specific wireless transmission channel.

28. Computer readable media embodying a method of processing packets of received data, the method comprising:
  decoding a plurality of data packets received over a plurality of wireless transmission channels at the wireless communications device, each data packet associated with a packet group;
  collecting complete and incomplete packet groups received over each wireless transmission channel in a buffer arrangement;
  identifying sequence gaps in the plurality of data packets;
  inserting later received data packets into the proper sequence gap within the associated packet groups in the buffer arrangement where possible to complete packet groups and minimize sequence gaps in the data packets; and
  sending packet groups and later received data packets not properly sequenced from the buffer arrangement to a resequencer.

* * * * *